US012782185B2

(12) United States Patent
Clark et al.

(10) Patent No.: US 12,782,185 B2
(45) Date of Patent: Nov. 3, 2026

(54) UTILITY BOX BASE SUPPORT

(71) Applicants: Jacob N. Clark, Newton Grove, NC (US); Nicholas W. Pope, Coats, NC (US)

(72) Inventors: Jacob N. Clark, Newton Grove, NC (US); Nicholas W. Pope, Coats, NC (US)

( * ) Notice: Subject to any disclaimer, the term of this patent is extended or adjusted under 35 U.S.C. 154(b) by 0 days.

(21) Appl. No.: 18/582,876

(22) Filed: Feb. 21, 2024

(65) Prior Publication Data

US 2025/0093192 A1 Mar. 20, 2025

Related U.S. Application Data

(60) Provisional application No. 63/486,303, filed on Feb. 22, 2023.

(51) Int. Cl.
*G01F 15/14* (2006.01)

(52) U.S. Cl.
CPC .................................... *G01F 15/14* (2013.01)

(58) Field of Classification Search
CPC ...... G01F 15/14; B65F 1/1421; B65F 1/1447; B65F 1/1415
USPC ........................................................ 220/484
See application file for complete search history.

(56) References Cited

U.S. PATENT DOCUMENTS 2,594,012 A * 4/1952 Griffin .................... G01F 15/14 220/323
3,913,400 A * 10/1975 Floren ..................... G01F 15/14 73/431
3,952,908 A * 4/1976 Carson ..................... H02B 1/06 220/831
4,163,503 A * 8/1979 McKinnon ............... H02G 9/10 220/254.3
4,872,575 A * 10/1989 Kobilan ................... H02G 9/10 220/234
5,333,750 A * 8/1994 McKinnon ............... H02B 1/50 220/675
6,749,080 B1 * 6/2004 White ..................... E03B 7/095 137/381
6,899,240 B2 * 5/2005 Dang ....................... E03B 7/095 52/128
8,249,411 B2 * 8/2012 Burke .................. G02B 6/4442 385/135
8,796,548 B2 * 8/2014 Rost ........................ H05K 5/061 174/50
11,509,125 B1 * 11/2022 Dembkoski ............ H02G 3/086
2009/0211779 A1 * 8/2009 Drane ....................... H02G 3/14 174/67
2012/0228302 A1 * 9/2012 Byrns ...................... H02G 9/10 53/485
2014/0158692 A1 * 6/2014 Lobban ................. B65F 1/1447 220/484
2014/0263343 A1 * 9/2014 Geerligs ................. E03B 7/095 220/484
2014/0268506 A1 * 9/2014 Emanuel .................. H02G 9/10 361/659

(Continued)

*Primary Examiner* — Rafael A Ortiz

(57) ABSTRACT

A utility box base support is disclosed. The utility box base is a single piece unit made of lightweight, durable materials, substantially rectangular shaped with rounded corners, and may be configured to maintain the position of the utility box upon the base upper surface. The utility box base includes additional support structures for various components inside the box.

17 Claims, 11 Drawing Sheets

(56) References Cited

U.S. PATENT DOCUMENTS

| | | | | |
|---|---|---|---|---|
| 2016/0176629 | A1* | 6/2016 | Dang | F16B 37/0857 220/315 |
| 2022/0149601 | A1* | 5/2022 | Nolen | H02G 9/10 |

* cited by examiner

UTILITY BOX BASE SUPPORT

CROSS REFERENCE TO RELATED APPLICATIONS

This application claims priority to U.S. Provisional Application Ser. No. 63/486,303 filed Feb. 22, 2023, which is incorporated by reference in its entirety.

TECHNICAL FIELD

Construction materials used in utility installations, namely water meter, communications, and irrigation boxes and base supports.

BACKGROUND

Public and/or private water utilities often charge customers by the amount of water in gallons they use over prescribed periods of time. The water flow rate is gauged by flow meters that are often found in outside installations at the bottom of excavated pits. Meter boxes are inserted within the pits to house and protect the various necessary components for metered water service including, for example, a water meter yoke and the water meter itself. A water meter yoke may be single check valve or a double check valve design.

Conventional meter boxes, which are typically made of plastic material and substantially rectangular in shape, must have underside support between the box and the ground. Conventional boxes rest on the underside support which, in most cases, consists of a 2" thick rectangular shaped brick base support haphazardly mortared together end on end.

Building the brick base support is a time consuming, cumbersome, and imperfect operation. For example, the brick support must be assembled from the inside of the pit, and it is quite difficult from that position to build a brick support with a sufficiently level upper surface upon which the meter box rests. The mortar degrades over time causing cracks between the bricks resulting in more leveling challenges, as well as increased moisture within the box. Grass, weeds, and roots grow through the mortar and creep into the interior the meter box.

Another problem with conventional meter boxes in general is the lack of a functional brace or support for pipes and other utility materials like fiber optic cable that the utility box is designed to protect. For example, water meter yokes must be kept substantially upright such that the water meter and any valves are visible and accessible. The same principle applies to other conventional utility boxes, such as communications (e.g., phone, cable, etc.) boxes or non-utility boxes designed to house components required for residential or commercial activities, such as irrigation. Such conventional boxes also suffer from poor support and accessibility for essential components like pipes, valves, or communication lines, such as coaxial cable and fittings.

What is needed is a support for a conventional utility box that is light weight, quickly and conveniently installed, maintenance friendly, simple to clean, relatively inexpensive to manufacture, allows access and provides support to ground level components, while elevating utility boxes and protecting other components inside a utility box from dirt, weeds, and debris.

SUMMARY

Accordingly, an objective of this invention is to provide a relatively inexpensive and reliable support apparatus for a utility box. "Utility" is defined as a service or other activity provided, controlled, and maintained by, for example, city, county, state, provincial authorities or commercial contractors. "Utility" also includes commercial or residential activities that are not provided, controlled, or maintained by authorities or contractors, such as common commercial or residential irrigation, or the like.

In an embodiment, the utility box support apparatus can include a base or platform that, in some embodiments, can be a single piece, and made from lightweight durable materials, such as polyolefin compounds, polyvinyl compounds, and/or blends thereof. In one embodiment, the shape of the base or platform substantially conforms to the bottom end of the utility box wall. The utility box base can be substantially round, oval, circular, or square shaped. Alternatively, the utility box base can be substantially rectangular shaped with rounded corners.

In one embodiment, the utility box base can include central portion that substantially conforms in shape to the hollow interior portion of a conventional utility box. In other embodiments, the utility box base can include an outer support member positioned beneath the bottom end of the plastic utility box wall to support the same. In some embodiments the central portion of the utility box base is hollow. In this embodiment, the outer support member is the only solid component of the utility box base and the central portion is an aperture with ground exposed beneath. In one embodiment, the outer support member can have an interior lip and an exterior lip. The interior lip can extend from the inner rim at the bottom end of the utility box into the interior of the utility box and the exterior lip can extend from the outer rim at the bottom of the utility box toward the wall of the excavated hole. In one embodiment, the interior lip and the exterior lip are the same width.

In one embodiment, the outer support member can include a slot or trench positioned on the upper surface of the outer support member. In some embodiments, the slot or trench extends about the support member's entire upper surface. The slot or trench may be centrally located on the support member's upper surface. In the embodiment where the central portion of utility box base is hollow or open with ground exposed below, the slot or trench is positioned between the interior lip and exterior lip such that the interior lip and exterior lip are of substantially equal width. In another embodiment, the slot or trench is sufficiently wide and deep to receive the bottom end of the plastic utility box. In one embodiment, the slot or trench can include at least one fastener or rib positioned along at least one wall of the slot or trench. The at least one rib can lockingly engage complementary structures at the bottom end of the utility box to lock the base in place. In other embodiments, one or more tabs are provided to secure the utility box base to the utility box. In one embodiment, a plurality of tabs can be affixed to the upper surface of the base or platform at variable positions to accommodate and secure different sized utility boxes and prevent lateral movement of the utility box upon the upper surface of the base.

In another embodiment, the central portion of the base substantially covers the underside of the utility box, such that virtually no ground or soil is visible underneath. In this embodiment, the base can contain one or more pipe support elements. For example, in one embodiment, the base is substantially "H" shaped and include two opposing pipe support slots extending from the outer edge of the base toward the center. In some embodiments, there is only one support slot. In another embodiment, the at least one support slot can contain a locking groove positioned along the inner edge of the support slot. In one embodiment, the locking groove is stepped. In yet another embodiment, the utility box base contains a locking key that can engage the locking groove at, for example, the stepped surface such that the upper surface of the locking key is flush with the upper surface of the base. In yet another embodiment, the locking key can include one or more flanges that contact the base at, for example, locking slot and/or lower surface of the base.

In yet another embodiment, the central portion of utility box base contains one or more removable panels for greater accessibility of components underneath through the openings in the central portion. In one embodiment, each panel contains a yoke slot as described above. The openings or apertures that are covered by the panels can contain one or more support elements (e.g., a lip, protrusion, rim, or stepped surface) positioned below the upper surface of the central portion. In this embodiment, the upper surface of the panels are flush or substantially co-planar with the upper surface of the central portion when panels are placed in their cover position. It should be noted that upper surface of the base/platform can, in some embodiments, include the central portion upper surface and the outer support member upper surface as discussed above.

The base and the utility box itself can contain other structural features, for example, one or more levels attached to either the upper or lower surface of the base. Additionally, vents or drains can be included to circulate air under the base and cool electrical wires and/or other components under the base and drain water from the upper surface of the base. The utility box can contain one or more mouse holes in the sides of the box configured to receive a pipe which, in some embodiments, is can be elevated off the ground, for example, by a pipe cradle or other support element configured to support the pipe.

These and other objectives will be made manifest when considering the following detailed description when taken in conjunction with the appended drawing figures.

DETAILED DESCRIPTION

Further scope and applicability of the present invention will become apparent from the detailed description of exemplary embodiments provided herein. However, it should be understood that the detailed description and specific examples, while indicated embodiments of the invention, are given by way of illustration only, since various changes and modifications within the spirit and scope of the invention will become apparent to those skilled in the art.

An exemplary utility box support apparatus 100 is shown in FIGS. 2-5.

Figure 1:
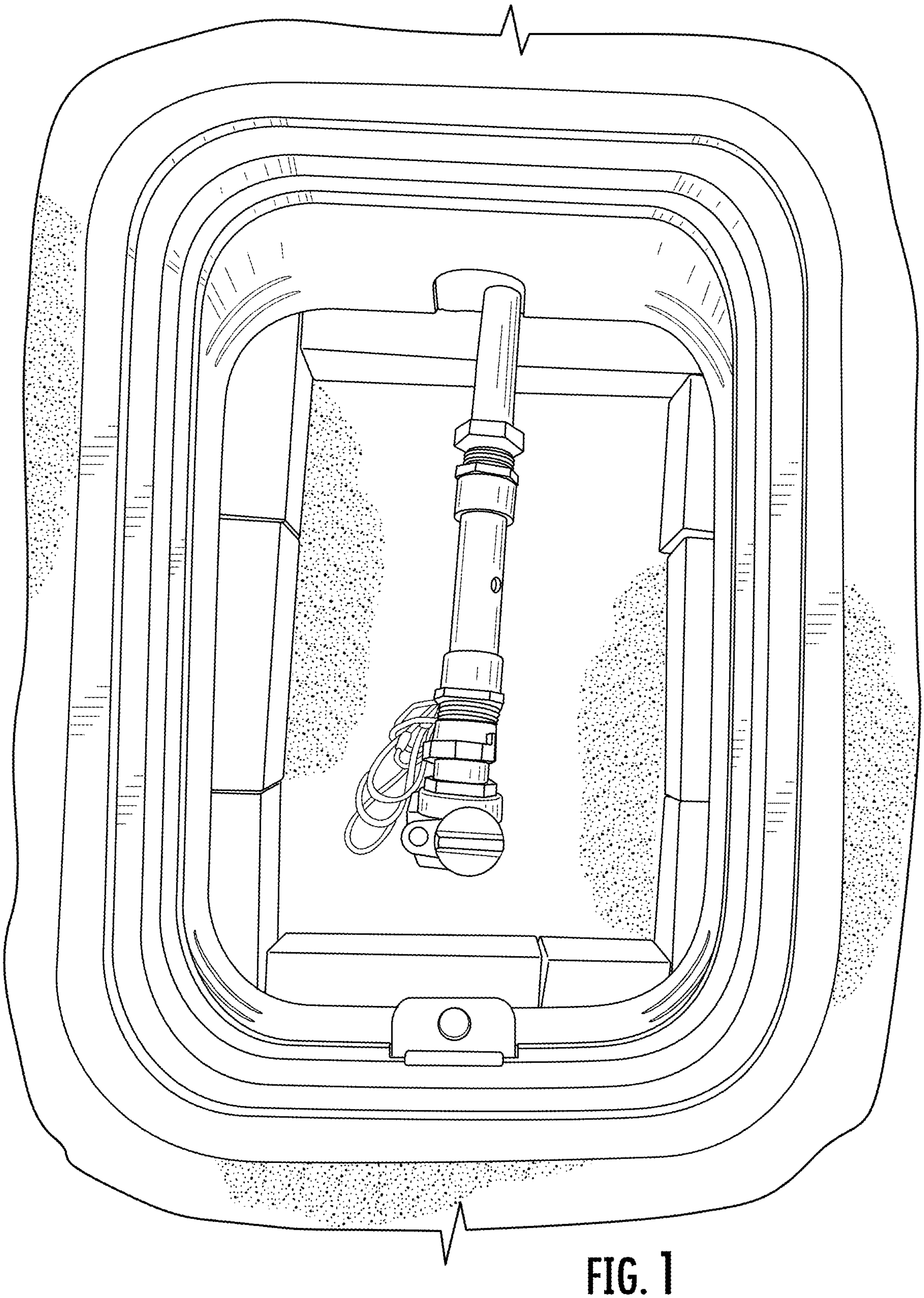
FIG. 1 depicts a conventional utility box and brick and mortar utility box base installation.
Figure 2:
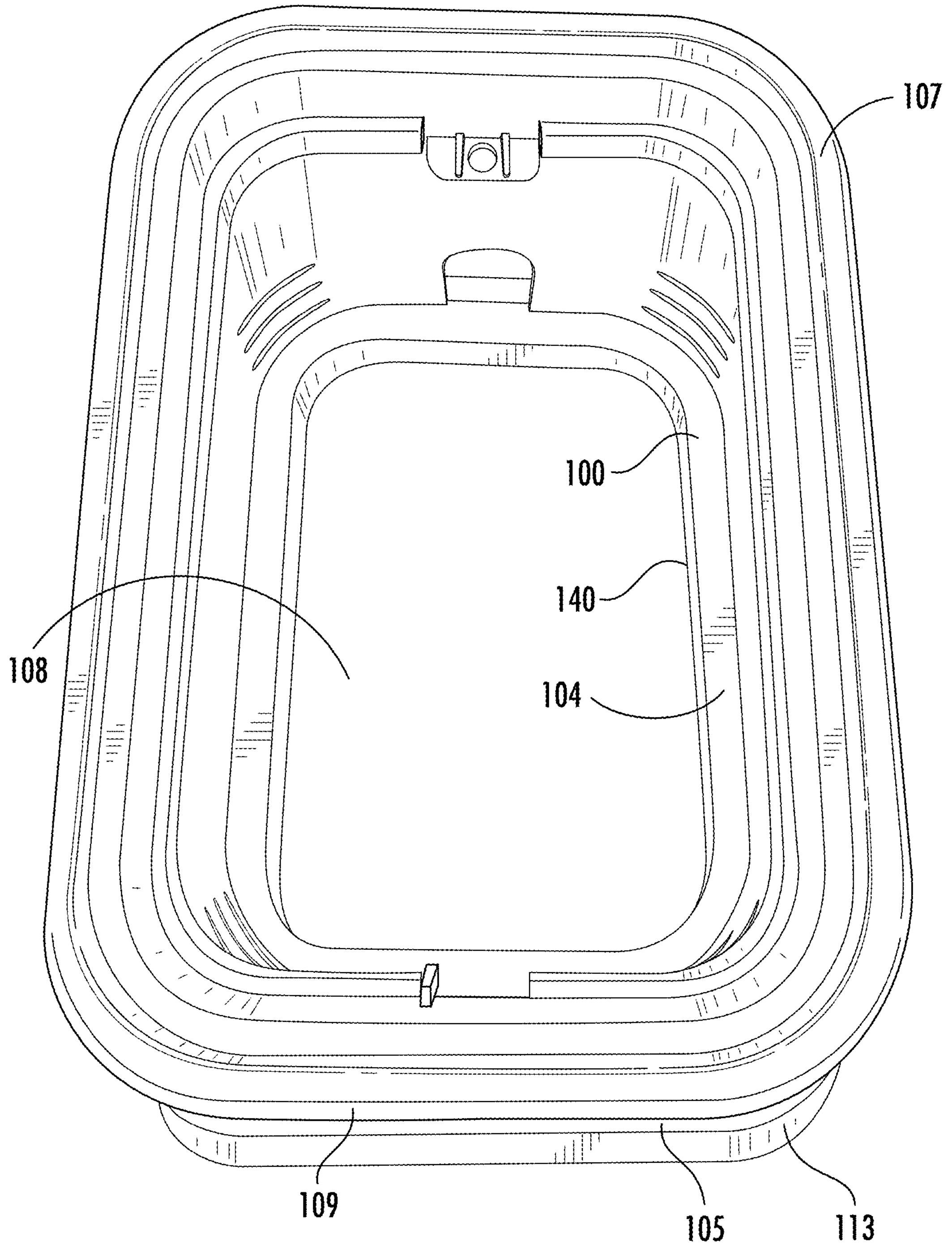
FIG. 2 depicts a utility box resting on an embodiment of the utility box base.
Figure 3:
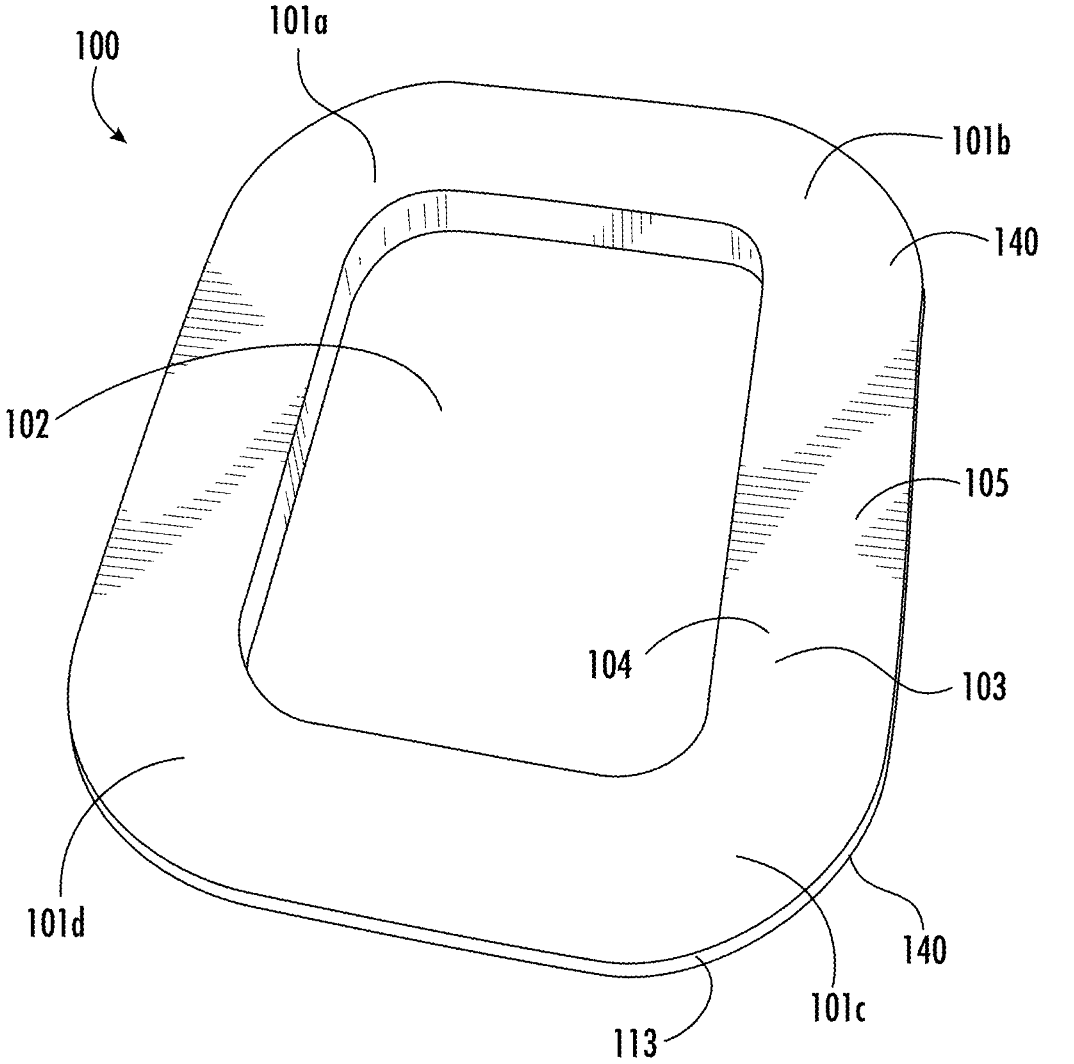
FIG. 3 depicts the general shape of an embodiment of the utility box base.
Figure 4:
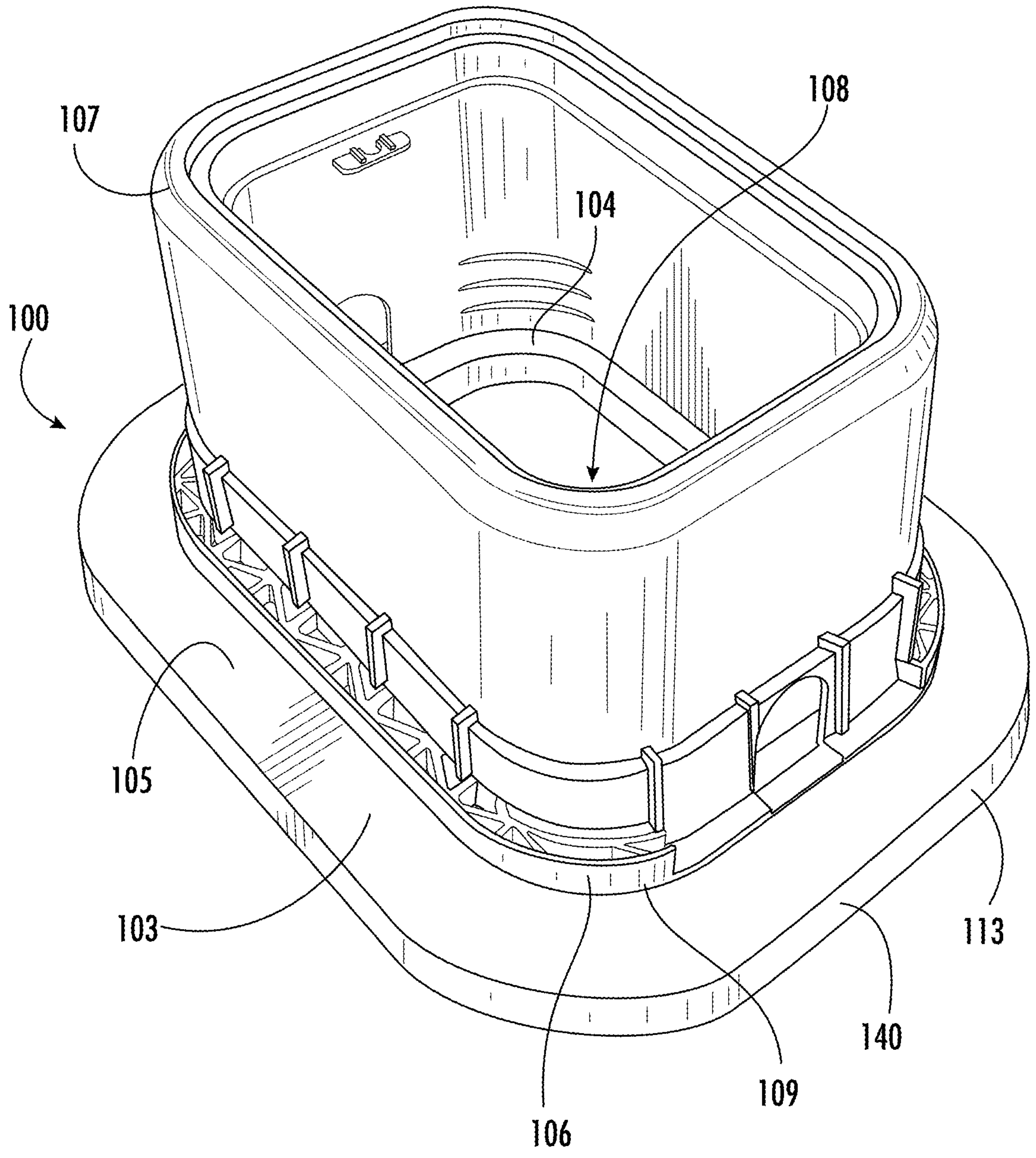
FIG. 4 depicts a utility box resting on an embodiment of the utility box base.

FIGS. 2-4 depict a basic design of one of the embodiments described below. FIG. 1 illustrates the conventional base designs made from brick and mortar which can be seen at the bottom of the utility box. The utility box in FIG. 1 is resting upon the upper surface of the brick base. Referring to the embodiment shown in FIGS. 5-6, 8, 9, and 11 the utility box support apparatus 100 includes a base or platform 140 which, in some embodiments, can be a single piece design (as shown) and made from lightweight durable materials such as, for example, polyolefin compounds, polyvinyl compounds, and/or blends thereof. In some embodiments, the material can comprise low density polyethylene (LDPE), linear low density polyethylene (LLDPE), high density polyethylene (HDPE), and/or polypropylene (PP). Other suitable lightweight durable materials are also contemplated and within the scope of this invention.

Figure 5:
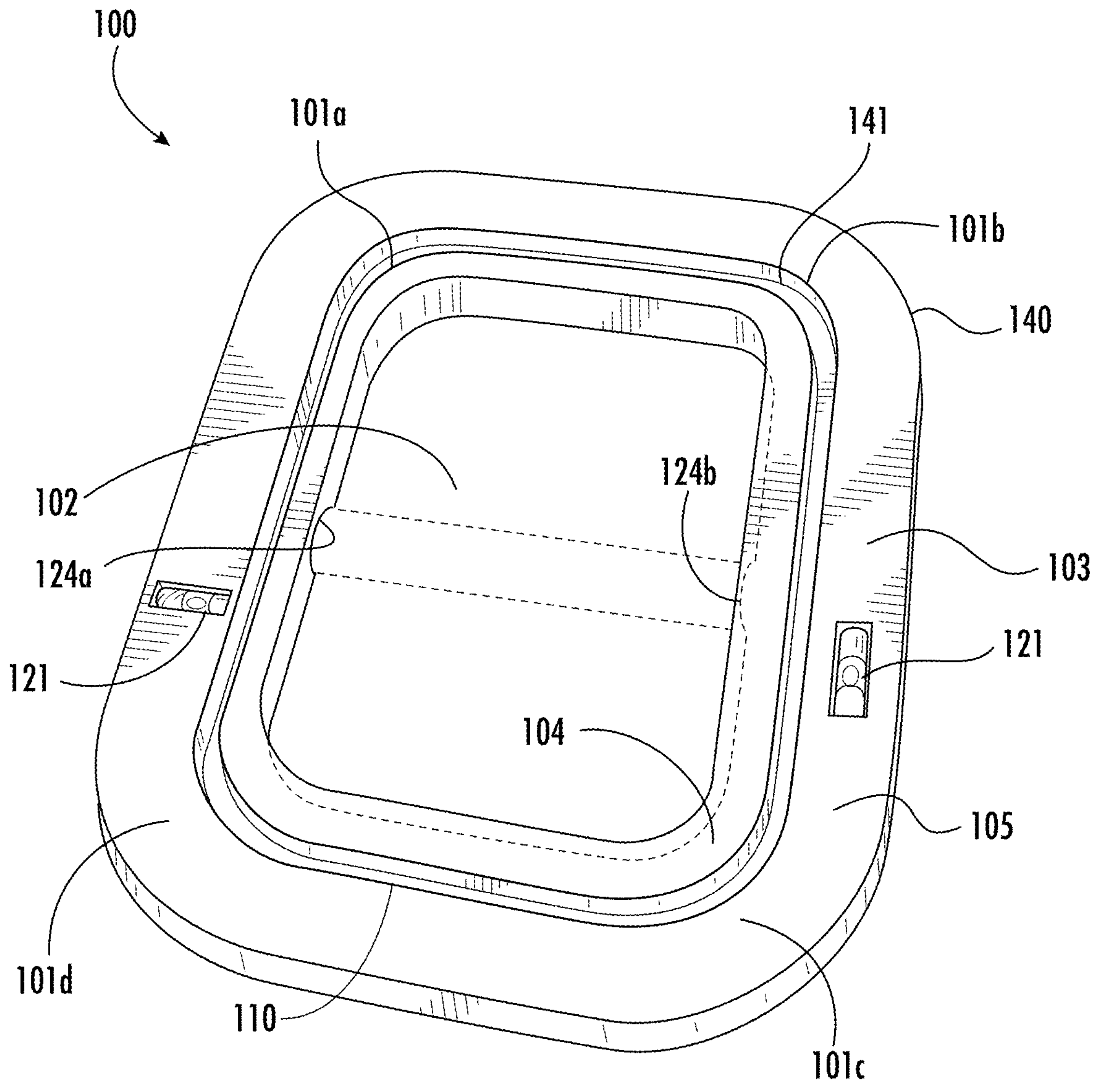
FIG. 5 is a schematic drawing illustrating an embodiment of the utility box base with a hollow central portion.
Figure 6:
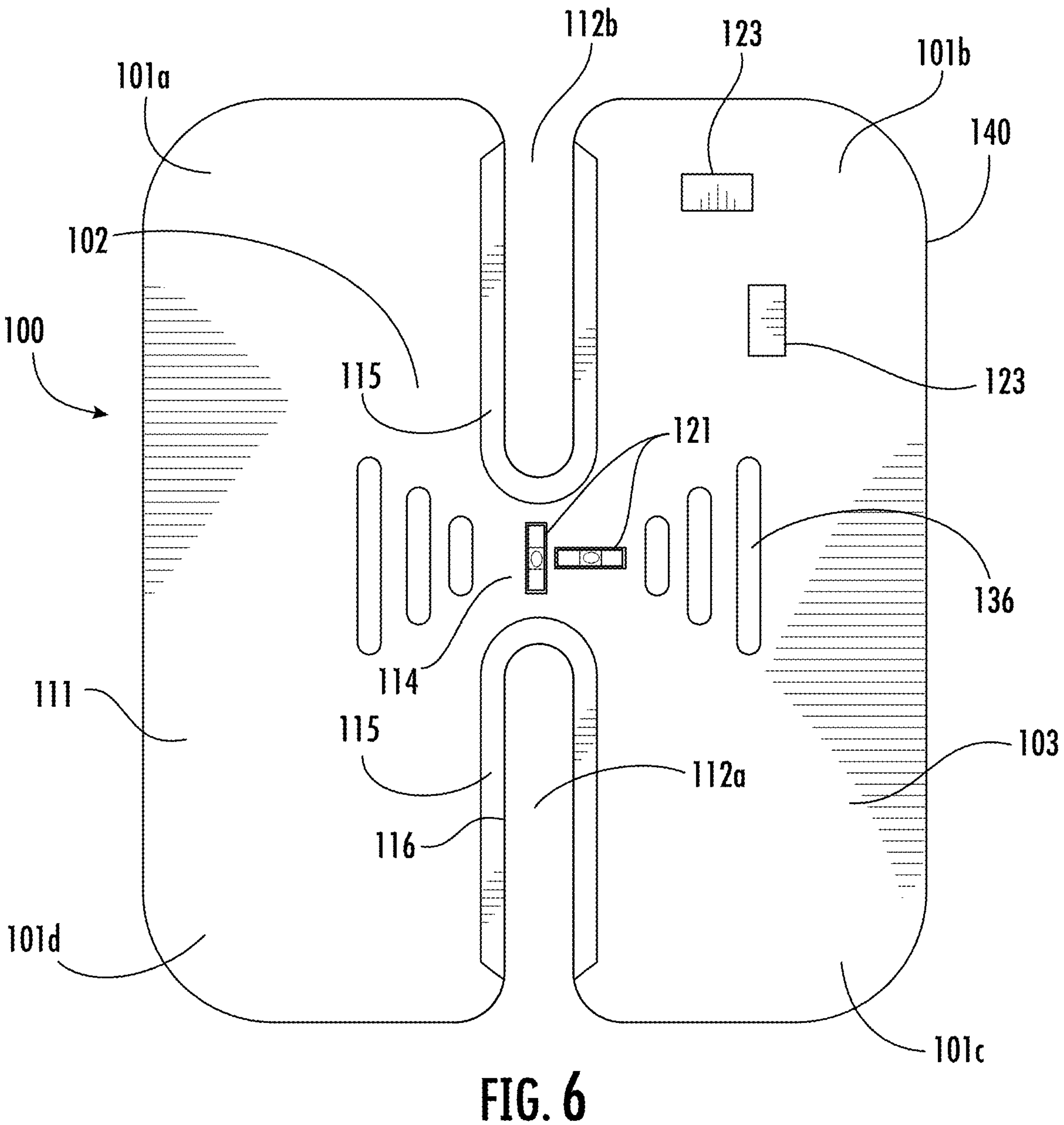
FIG. 6 is a schematic drawing illustrating an embodiment of the utility box base with pipe support slots and pipe locking groove.
Figure 7A:
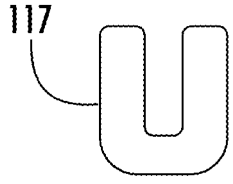
FIGS. 7A-7B show elevated and rear perspectives of an embodiment of the locking key.
Figure 7B:
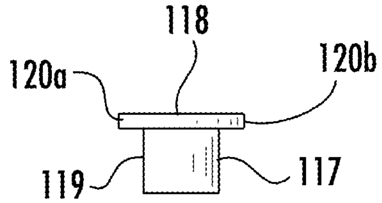

As shown in the embodiment of FIGS. 5-6, the shape of the base 140 substantially conforms to the bottom end of the utility box wall. The base can be substantially round, oval, circular, or square shaped. Alternatively, the base 140 can be substantially rectangular shaped with rounded corners 101*a*-*d*. In some embodiments, the base or platform 140 is between about 2" and 4" thick. In another embodiment, the base 140 is about 4" thick. Exemplary dimensions of the base 140 can be 26"×21"×2".

The utility box base or platform can include central portion 102 that substantially conforms in shape to the hollow interior portion of a conventional plastic utility box. The utility box base 140 can, furthermore, include an outer support member 103 that is positioned beneath the bottom end of the utility box wall in order to support the same.

In the embodiment shown in FIGS. 2-5, the central portion 102 of the base is hollow, forming a ring or "doughnut" shape. In this embodiment, the outer support member 103 is a solid structural component of the base and the central portion (or central element) 102 is defined by an aperture or opening with ground surface largely exposed beneath. With continued reference to FIG. 5, the outer support member 103 can have an interior flange 104 and/or an exterior flange 105. As shown, the interior flange 104 appears to be protruding from an inner rim at the bottom end 106 of the plastic utility box 107 into the interior 108 of the plastic utility box 107 and the exterior flange 105 appears to be protruding from the outer rim 109 at the bottom end 106 of the utility box 107 toward the wall of the excavated hole. It should be noted that the interior and exterior flanges, as structural features of the base or platform upon which the utility box rests, are not actually protruding from the box 107. In one embodiment, the interior flange 104 and the exterior flange 105 are the same width. In another embodiment, the interior flange 104 is approximately 1" wide as measured from a slot or trench (described below). The exterior flange 105 is approximately 3" wide as measured from the slot or trench (described below). In one embodiment, the total width of the outer support member is approximately 4" wide.

With continued reference to FIG. 5 and as mentioned above, the outer support member 103 can include a slot or trench 110 positioned on the upper surface 111. Upper surface 111 is intended to refer to the platform upper surface 111, which also includes upper surfaces of the central portion and the outer support member. In this embodiment, trench 110 extends around the entire upper surface of outer support member 103. The slot or trench may be centrally located on the support member 103 or slightly off center as shown in FIG. 5. In the embodiment where the central portion of the base is hollow, the slot or trench 110 is positioned between the interior flange 104 and exterior flange 105 and defines the boundary between the interior flange 104 and exterior flange 105. The slot or trench 110 can be sufficiently wide and deep, such that it is configured to receive the bottom end 106 of the utility box 107. By placing the bottom end 106 of the utility box 107 within the trench 110, the utility box 107 maintains its position and resists movement along the surface of the outer support member 103. In one embodiment, the slot or trench 110 can include at least one locking element or fastener 141 adapted to lockingly engage structural features at the bottom end 106 of utility box 107 to hold the base in position and secure the base to the utility box. For example, a rib 141 can be positioned along at least one wall of the slot or trench 110 that engages a complementing slot positioned on the utility box bottom end 106. It should be apparent from the description above, that the base 140 can be mounted or attached/demounted or detached to the bottom end of the utility box 107 quickly and efficiently.

Figure 14:
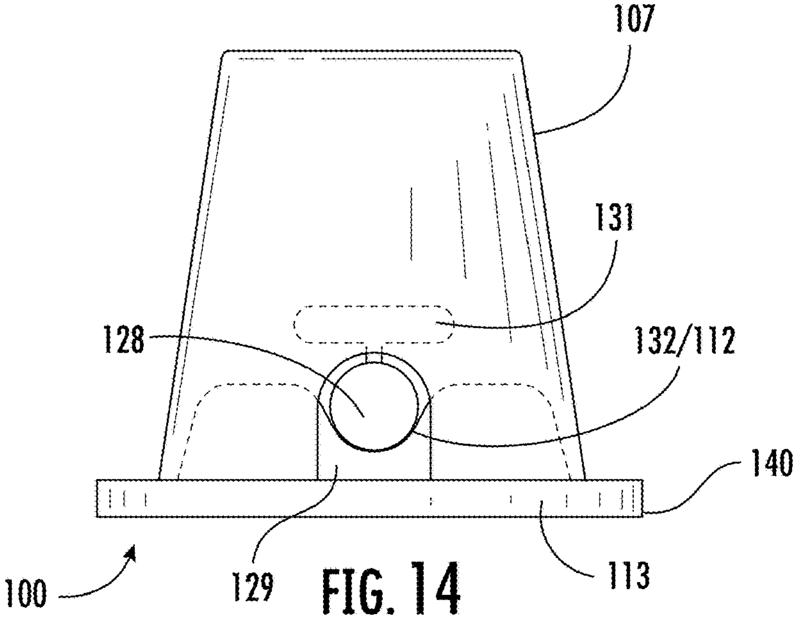
FIG. 14 shows a side view of the utility box base embodiment and utility box illustrated in FIG. 13.
Figure 15:
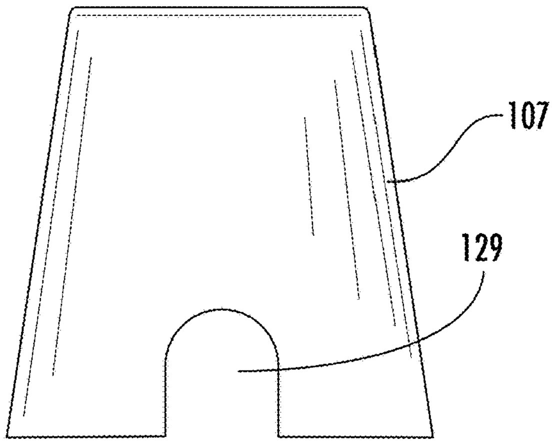
FIG. 15 shows a side view of a utility box with mouse hole shown.

With continued reference to FIGS. 5, 14 and 15, base 140 can include one or more braces 124*a-b* (or apertures, holes, and/or openings bored out of the outer support member 103) affixed or integral to the outer support member 103 that are configured to receive an elongated object, such as a PVC pipe (shown in dotted line) used to stabilize pipes or yokes in the case of a water meter. Some conventional yokes possess bracket(s) at the bottom of the yoke that receive an elongated object(s), such as the PVC pipe shown in the figure to help stabilize the yoke. Opposing braces 124*a-b* (e.g., U shaped braces), shown in FIG. 5 as co-planar, receive the ends of the elongated object, which extends through the yoke braces as described above, and hold the yoke in a level, substantially upright position. Furthermore, the position of braces 124*a-b* can be configured to elevate the yoke to a desired (often based on public works specifications) height within the utility box, which traditionally is elevated by back_filling the excavated pit to the desired height.

Referring now to FIG. 6, the base 140 is shown to contain a central portion 102 that substantially covers the underside of the hollow utility box interior, such that very little ground, soil, or aggregate material is visible underneath providing additional protection to essential components from soil, weeds, grass, etc. In this embodiment, the utility box base can contain one or more pipe or yoke support elements. For example, as shown in FIG. 6, the utility box base 140 is substantially "H" shaped and includes two opposing pipe support or yoke support slots 112*a-b* extending from the outer edge 113 of the utility box base 140 toward the center 114. In some embodiments, there is only one pipe support slot 112. In some embodiments, the pipe support slot 112 can be about 2" wide and about 11" long. As explained in greater detail below, the utility box 107 can contain one or more mouse holes formed in the side to allow entry of a pipe into the interior of the utility box 107. In some embodiments, the pipe extends through the interior and out of another mouse hole in a second side (e.g., opposite side) of the utility box. In preferred embodiments, the pipe can be elevated off the ground surface as described previously.

Figure 12:
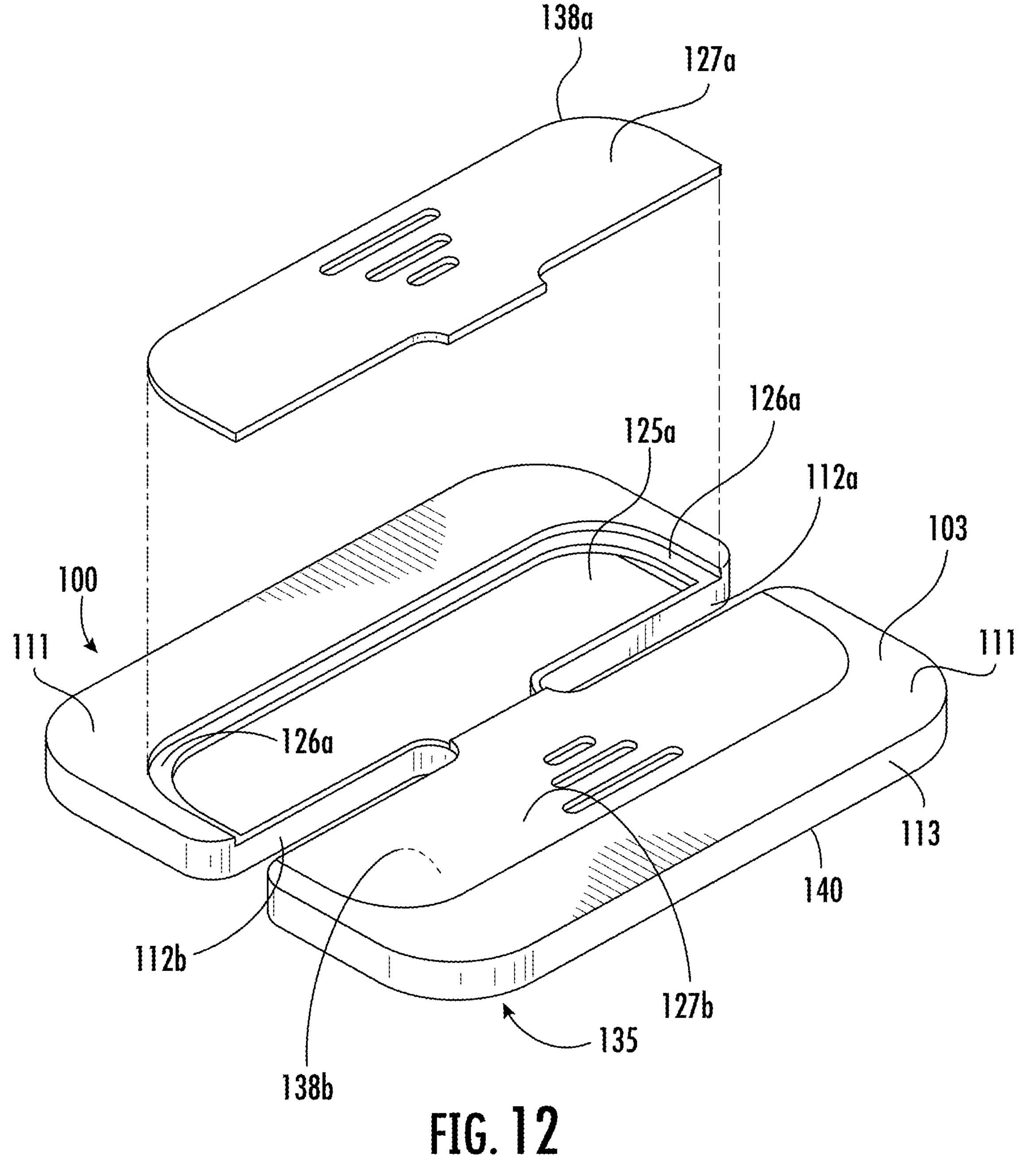
FIG. 12 shows an embodiment of the utility box base with removable panels.

It should be understood that the utility box base 140 can contain two or more removable panels for greater accessibility of components located beneath the base 140. For example, utility box base 140 shown in FIG. 12 has two removable panels 138*a-b*, and two apertures 125*a-b* that the panels cover. In the embodiment shown, panels 138*a-b* are not covering pipe support slots 112*a-b*, however, panels may be designed to cover the slots as well. In some embodiments, base 140 has a lip 126*a-b* about the perimeter of aperture 125*a-b* upon which the panels rest. The lip 126*a-b* can be positioned below the upper surface 111 of base 140 (e.g., stepped) such that the upper surface 127*a-b* of panels 138*a-b* is flush or co-planar with upper surface 111.

Figure 8:
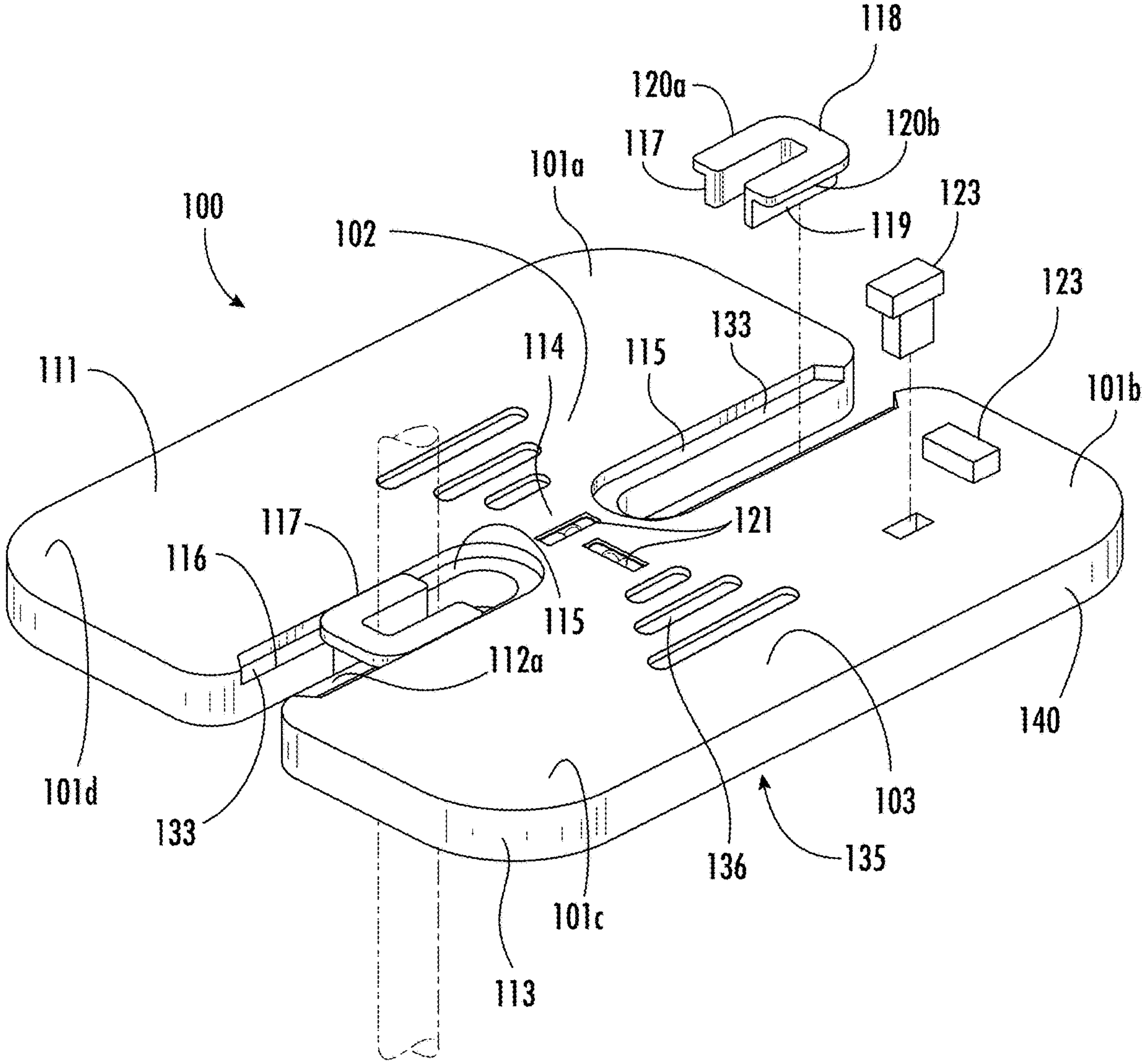
FIG. 8 shows side/elevated view of an embodiment of the utility box base with pipe support slots, pipe support grooves, and locking key engagement.
Figure 10A:
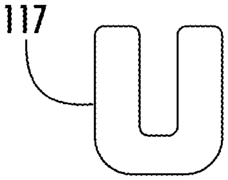
FIGS. 10A-10B elevated and rear perspectives of another embodiment of the locking key.
Figure 10B:
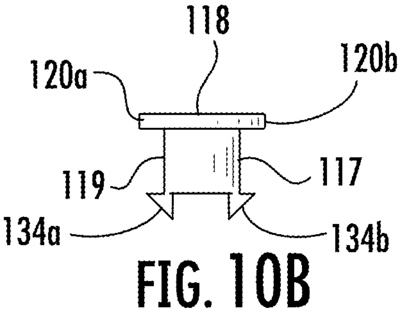
Figure 11:
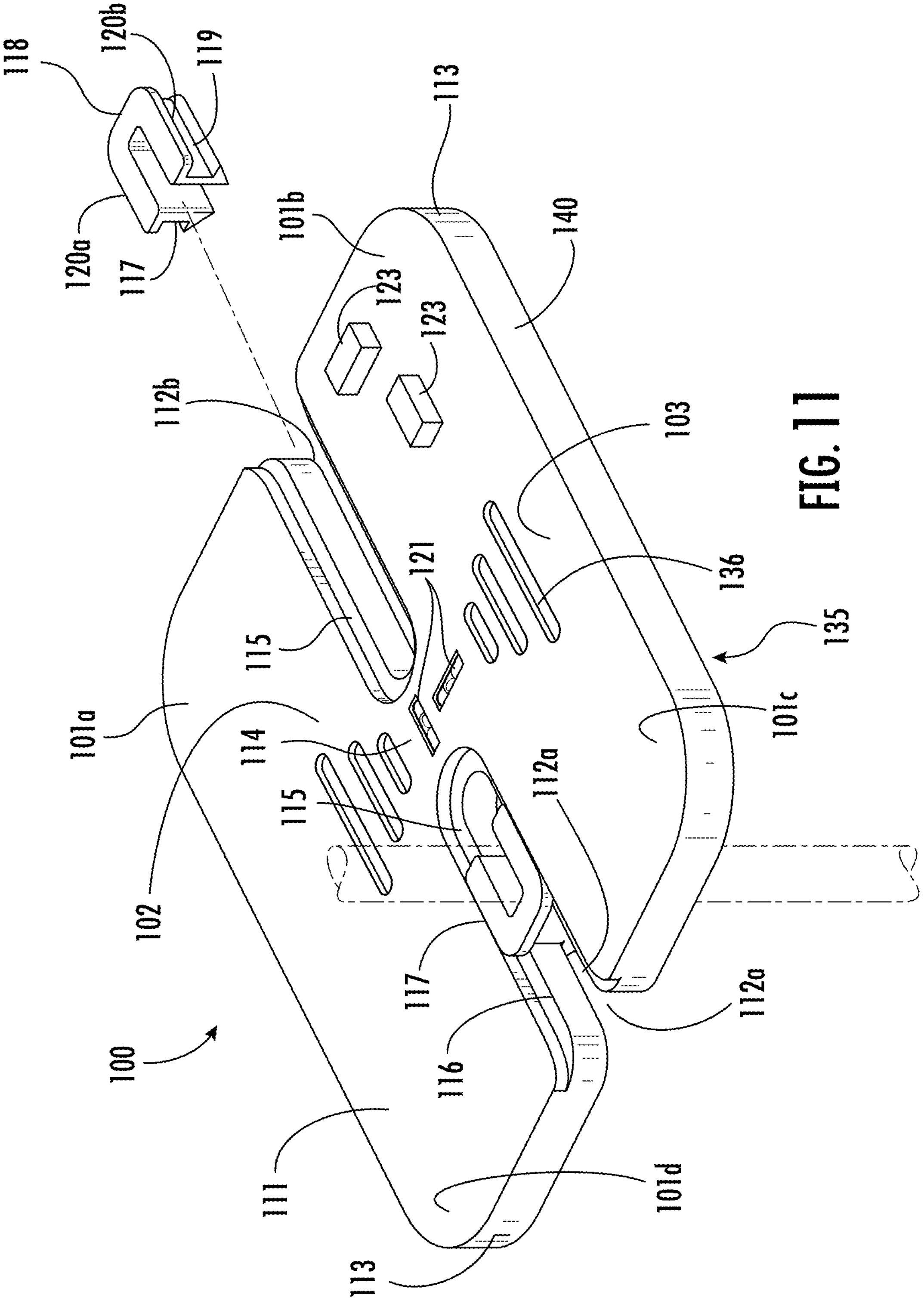
FIG. 11 shows side/elevated view of an embodiment of the utility box base with pipe support slots, pipe support grooves, and locking key engagement.

With reference to FIGS. 6, 8-9, and 11, in another embodiment, the at least one pipe or yoke support slot 112 can contain a locking groove 115 positioned along the inner surface 116 of the slot 112 and configured to receive a pipe or yoke locking key 117. In the embodiment shown, for example, in FIG. 8, the locking groove 115 contains a stepped surface 133 for engagement with a locking key described in more detail below. In the embodiment illustrated in FIGS. 6-11, the locking key 117 is about 2" long and includes an approximately 3" wide upper portion 118 and an approximately 2" wide lower portion 119. In this embodiment, the upper portion 118 is about 0.5" thick and can form opposing upper flanges 120*a-b* configured to engage the stepped surface 133 of locking groove 115, such that the pipe or yoke is held in an upright position upon installation. In some embodiments, the locking key 117 is slidably engaged to groove 115 and configured to slide into the groove 115 as the base 140 is installed or mounted to a utility box as explained above. Additionally, the locking key 117 also can be configured to flush mount (via engagement with stepped locking groove 115) with the upper surface 111 of base 140 as shown in FIGS. 8 and 11. In some embodiments, the lower portion 119 of locking key 117 can contain lower opposing flanges 134*a-b* which engage lower surface 135 of base 140 as illustrated in FIGS. 10B and 11. It should be understood that other locking or support structures can be used to support the pipe and hold it in any required position. For example, the center 114 of base 140 can be used to affix a brace or bracket.

As illustrated in FIGS. 5 and 6, utility box base 140 can contain other useful structural features, for example, one or more levels 121 configured to aid the installation process and help ensure that the box is level within the excavated pit. The one or more levels may be affixed to the upper surface 111 of the base 140. The base 140 can further include one or more adjustable legs (not shown) attached to the lower surface 135 of the utility box base 140 for fine tuning the preferred grade of the base 140 as it rests inside the excavated pit at ground level and elevate the base 140 off the ground. In other embodiments, one or more fasteners or tabs 123 can be provided to secure the utility box base 140 to the utility box 107.

As shown in FIG. 6, one or more utility box locking tabs 123 can be positioned on the upper surface 111 of the platform 140, for example, in the region defined by the outer support member 103 and configured such that the bottom end 106 of utility box 107 is prevented from movement along the upper surface 111. In the embodiment illustrated in FIG. 6, two locking keys or tabs 123*a-b* are affixed to the upper surface 111 at each corner 101*a-d*, however, it should be understood that locking tab 123 positioning can be variable depending on the size, shape, and/or dimensions of the utility box 107.

Figure 9:
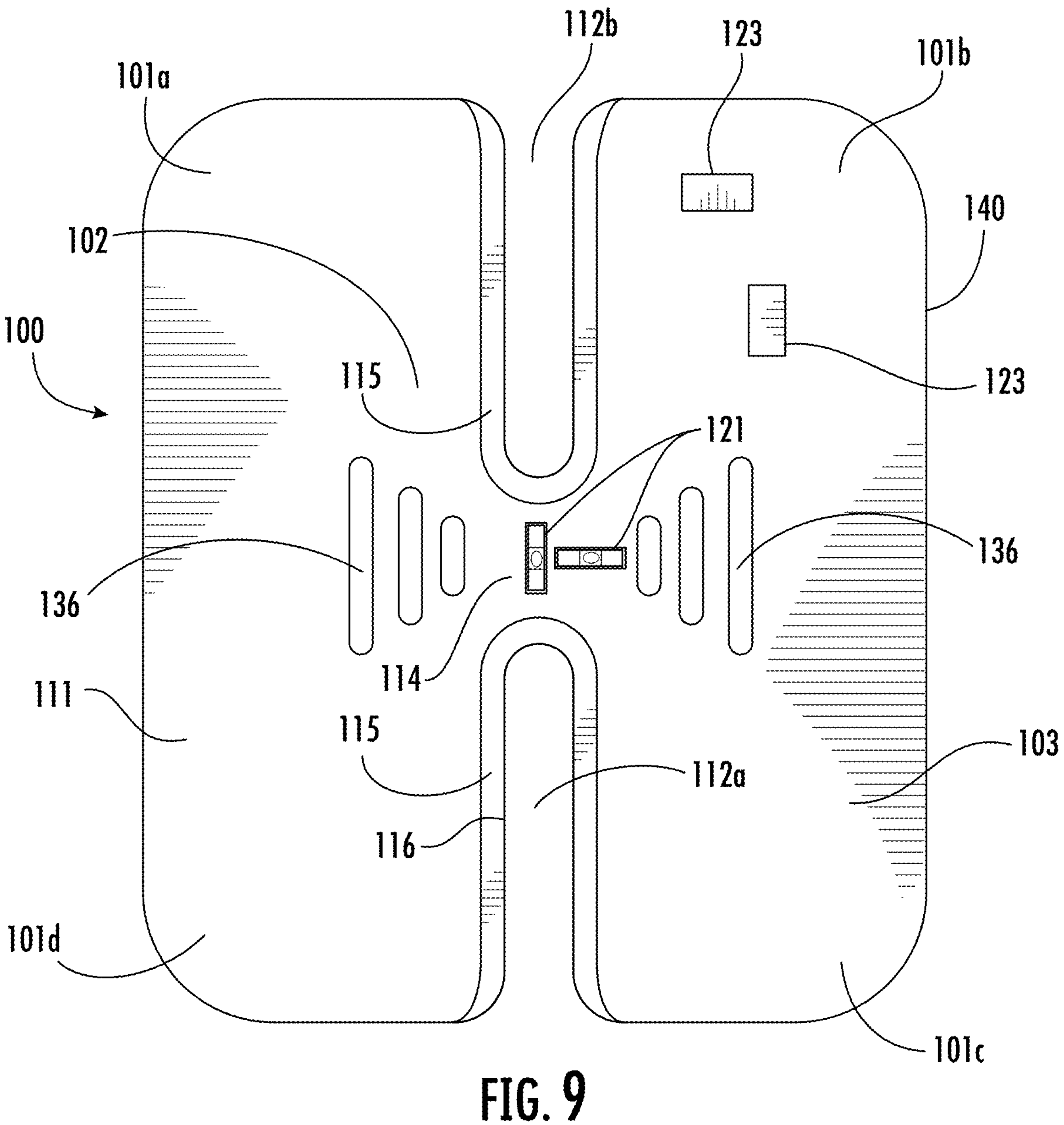
FIG. 9 shows an elevated view of an embodiment of the utility box base with pipe support slots and pipe support grooves.

In other embodiments, vents or drains 136 can be provided such that rain or ground water does not collect on the upper surface 111 of base 140 as illustrated in FIGS. 6, 8 and 9.

Figure 13:
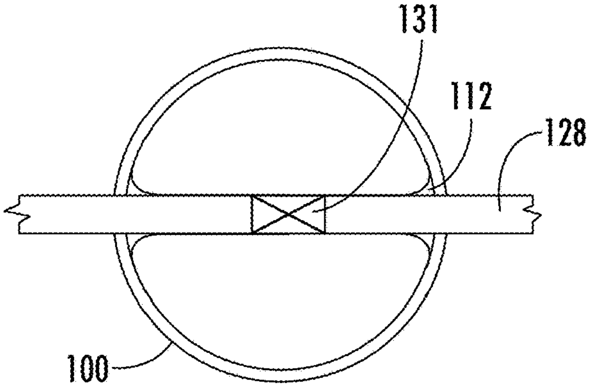
FIG. 13 shows an elevated view of another embodiment of the utility box base.

Referring now to FIG. 13-15, an embodiment of base 140 configured for an irrigation box is shown. Base 140 can contain a single slot 112 to house and support an irrigation pipe 128 extending through a first mouse hole 129 formed in a first side of the utility box 107, lengthwise through box 107 interior, and out a second mouse hole 130 formed in a second side of the utility box 107. The pipe shown in FIGS. 13-14 is elevated off the ground surface and has a valve 131 accessible from above. In another embodiment, (illustrated in FIG. 14), base 140 can include a pipe cradle 132 to support the pipe from below.

Exemplary embodiments of the invention can be described according to the following paragraphs:

A utility box support apparatus comprising a single piece platform comprising an upper surface, a lower surface, an outer support member configured to support a utility box, and a central portion.

The utility box support apparatus as described above wherein said central portion is a substantially solid structure configured to cover the ground surface and wherein said upper surface of said outer support member is co-planar with said upper surface of said central portion.

The utility box support apparatus as described above wherein said central portion comprises one or more removable panels.

The utility box support apparatus as described above wherein said central portion comprises two removable panels.

The utility box support apparatus as described above wherein said central portion is an opening adapted for full accessibility of ground level utility box components The utility box support apparatus as described above further comprising at least one pipe support slot centrally positioned within said single piece platform and adapted to receive a vertically oriented pipe or pipe valve.

The utility box support apparatus as described above wherein said at least one pipe support slot comprises a locking groove configured to receive a locking key.

The utility box support apparatus as described above wherein said locking key comprises at least two opposing flanges configured to slidably engage said at least one locking groove.

The utility box support apparatus as described above wherein said upper surface of two opposing flanges are flush with the upper surface of the utility box base when inserted.

The utility box support apparatus as described above wherein the pipe support slot contains a stepped inner surface for supporting opposing flanges of locking key.

The utility box support apparatus as described above wherein the locking key comprises lower opposing flanges that engage lower surface of the utility box base.

The utility box support apparatus as described above wherein said outer support member comprises a trench configured to receive the bottom end of said water utility box.

The utility box support apparatus as described above further comprising at least one utility box locking keys configured to hold said utility box in position on the upper surface of said utility box base.

The utility box support apparatus as described above wherein said outer support member comprises an inner flange protruding toward the interior of the utility box and an outer flange protruding toward the exterior of the utility box.

The utility box support apparatus as described above wherein said trench defines the boundary between said inner flange and said outer flange.

The utility box support apparatus as described above wherein said inner flange is 1" wide.

The utility box support apparatus as described above wherein said single piece platform is substantially rectangular in shape with rounded corners.

The utility box as described above wherein said outer support member is 4" wide.

The utility box support apparatus as described above wherein said single piece platform is 4" thick.

The utility box support apparatus as described above wherein said single piece platform is 2" thick.

The utility box support apparatus as described above further comprising at least one level configured to detect ground surface grade.

The utility box support apparatus as described above further comprising at least one adjustable legs affixed to said lower surface of said single piece platform adapted to adjust said single piece platform's angle relative to the ground surface The utility box support apparatus as described above wherein said single piece platform is 26"×21".

The utility box support apparatus as described above wherein said at least one yoke slot is 2" wide.

Although embodiments of the invention have been described and illustrated in detail, it is to be clearly understood that the same is intended by way of illustration and example only and is not to be taken by way of limitation. The spirit and scope of the invention are to be limited only by the terms of the appended claims.

What is claimed is:

1. An apparatus for supporting a utility box installed inside a utility box containment pit comprising:

a platform configured to be positioned below the utility box upon installation of each inside a utility box containment pit, said platform comprising;

an upper surface;

a lower surface configured to rest on a containment pit bottom surface;

a central portion;

a thickness between about 2" and about 4" said thickness defined as the distance between said upper surface and said lower surface;

at least one pipe support slot adapted to receive a vertically oriented pipe said pipe support slot comprising a locking groove having a stepped inner surface;

a locking key configured to be reversibly received within the locking groove; and an outer support member configured to reversibly mount a bottom end of said utility box such that the utility box is elevated above said containment pit bottom surface by a distance corresponding to the platform thickness.

2. The apparatus of claim 1 wherein said platform upper surface is substantially flat and covers the central portion and the outer support member.

3. The apparatus of claim 2 wherein said central portion comprises one or more removable panels.

4. The apparatus of claim 3 wherein said central portion comprises two removable panels.

5. The apparatus of claim 1 wherein said platform is substantially rectangular shaped and further comprises at least one outer edge, and a center, wherein said at least one pipe support slot extends from said at least one outer edge toward said center through the platform's thickness.

6. The apparatus of claim 1 wherein said locking key comprises at least two opposing flanges configured to slidably engage said stepped inner surface of said locking groove such that an upper surface of said locking key is flush with said upper surface of said platform.

7. The apparatus of claim 1 wherein said at least two opposing flanges comprise apper opposed flanges that engage said stepped inner surface of said locking groove, and lower opposed flanges configured to engage said lower surface of said platform.

8. The apparatus of claim 1 wherein said outer support member comprises a trench configured to receive the bottom end of said utility box.

9. The apparatus of claim 1 wherein said platform upper surface comprises at least one utility box locking tab(s) mounted thereto, and wherein said at least one utility box locking tab(s) is configured to hold said utility box in position on the upper surface of said platform.

10. The apparatus of claim 8 wherein said outer support member comprises an inner flange and an outer flange.

11. The apparatus of claim 10 wherein said trench defines a boundary between said inner flange and said outer flange.

12. The apparatus of claim 11 wherein said inner flange is 1" wide.

13. The apparatus of claim 1 wherein said outer support member is 4" wide.

14. The apparatus of claim 5 wherein said platform thickness is 4".

15. The apparatus of claim 5 wherein said platform thickness is 2".

16. The apparatus of claim 5 wherein said at least one pipe support slot is about 2" wide and between about 8" to 11" long.

17. The apparatus of claim 1, wherein said thickness is about 4".

* * * * *